UNITED STATES PATENT OFFICE.

CHARLES EDWARD WILSON, OF NEW YORK, N. Y.

IMPROVEMENT IN COMPOSITIONS FOR LINING FURNACES.

Specification forming part of Letters Patent No. 163,345, dated May 18, 1875; application filed November 9, 1874.

*To all whom it may concern:*

Be it known that I, CHARLES E. WILSON, a subject of the Queen of Great Britain, and a resident of the city, county, and State of New York, have invented a composition of matter, of which the following is a specification:

This invention relates to compounds of a refractory nature employed in coating or daubing furnaces or cupolas, upon the top of fire-bricks therein, and coating plumbago crucibles and ladle-stoppers, or in manufacturing crucibles and ladle stoppers, where the composition is subjected to great heat, and it is necessary to secure the greatest refracting quality; and it consists in a composition formed by mixing asbestus with plumbago and kaolin or good fire-clay, or any clay of a refractory nature, which, when ground together and diluted with water until it has attained about the consistency of mortar, will form a composition of great refractory and non-heat-conducting power.

To prepare the composition, take about forty parts of pulverized asbestus; ground plumbago, about twenty parts; ground kaolin, fire-clay, or any refractory clay, about forty parts. The asbestus and plumbago I then thoroughly mix together. Next I add a sufficient quantity of water to the clay to make it about the consistency of thick cream. The whole, to wit, the asbestus, plumbago, and clay-water, is then thoroughly mixed together, when the mass should assume the consistency of plaster or mortar. The quantity of water added to the clay should be such as to attain this result. The composition is then adapted to be applied as a lining, coating, or to be molded. After it has been thus used it should be thoroughly dried, when it will be ready to be subjected to the heat required in the art in which it is employed.

The particular object of my invention is to add to the wearing power of plumbago crucibles as now manufactured, which are made of a composition consisting of plumbago, fire-sand, and clay, by applying a coating or lining of this composition over the entire exterior or interior surface, or both, of such crucibles after they are worn thin and otherwise weakened and reduced in heat-bearing powers by repeated melts or heats in a furnace. This composition being a powerful non-conductor of heat, renders the crucible so lined or coated with it nearly equal to a new one in its working powers.

While I design especially to use this composition in coating and lining plumbago crucibles, it will be seen that it may also be used in coating or daubing furnaces or cupolas upon the fire-brick therein, and coating plumbago crucibles, or in manufacturing crucibles and ladle-stoppers. It will also be seen that this composition may be used to manufacture bricks that would take the place of the ordinary fire-bricks. It may also be used to coat pipes of any kind when it may be desirable to prevent the radiation of heat.

The asbestus is a more powerful non-conductor of heat than any material heretofore used for a similar purpose, and this, combined with plumbago and fire-clay, both non-conductors of heat, forms a composition of very great refractory power.

Plumbago crucibles of ordinary manufacture, calculated to run about twenty heats, would, when coated with my composition, run about thirty heats, thus increasing their heat-bearing power fifty per cent. The materials used in the composition are inexpensive, and the time and labor consumed in applying inconsiderable. At a cost of ten per cent. for coating a crucible fifty per cent. in value is added, thus saving the manufacturer forty per cent. When the extensive use of plumbago crucibles is considered, and the necessity, from their perishability in the uses to which they are subjected, of very frequently renewing them, it will be seen that, by this invention, a great saving will be effected by the manufacturers. Another very considerable advantage is, that my composition is less liable to retain slag or clinkers than the ordinary material from which plumbago crucibles are made.

What I claim is—

A compound consisting of asbestus, plumbago, and kaolin, substantially as and for the purpose set forth.

CHARLES EDWARD WILSON.

Witnesses:
W. H. JOHNSON,
EDMUND L. COLE.